United States Patent [19]
Breth

[11] Patent Number: 5,542,643
[45] Date of Patent: Aug. 6, 1996

[54] PNEUMATIC BALL VALVE OPERATOR

[76] Inventor: Newton Breth, 1030 Adams Cir., #114, Boulder, Colo. 80303

[21] Appl. No.: 236,412

[22] Filed: May 2, 1994

[51] Int. Cl.⁶ ............................................. F16K 31/12
[52] U.S. Cl. ................................... 251/62; 251/279
[58] Field of Search ................................. 251/62, 279

[56] References Cited

U.S. PATENT DOCUMENTS

| | | | |
|---|---|---|---|
| 1,108,183 | 8/1914 | Kendrick | 251/62 |
| 1,750,481 | 3/1930 | Martin | 251/279 |
| 2,908,478 | 10/1959 | Starrett | 251/279 |
| 4,278,108 | 7/1981 | Casacci | 251/62 |

FOREIGN PATENT DOCUMENTS

| | | | |
|---|---|---|---|
| 1092118 | 4/1955 | France | 251/279 |
| 2255376 | 2/1974 | Germany | 251/62 |

*Primary Examiner*—A. Michael Chambers
*Attorney, Agent, or Firm*—Douglass F. Vincent

[57] ABSTRACT

A ball valve operator for a ball valve mounted in a pipe and having a control handle with a first position corresponding to the valve's normal position and a second position corresponding to the valve's actuated position. The ball valve operator includes a pneumatic cylinder mountable on the pipe, for driving a piston having a proximal and distal end. An adaptor plate is provided for attachment to the control handle by fastening means with the piston being rotatably fastened to the plate. An adjustment slot in the adaptor plate movably receives the fastening means and allows the fastening means to be selectively locked in place, so that the operator may be adjusted to move the handle through approximately its full range of motion without exceeding that range.

3 Claims, 2 Drawing Sheets

PNEUMATIC BALL VALVE OPERATOR

TECHNICAL FIELD

This invention relates to pneumatic valve controls, and more particularly to pneumatic valve controls adaptable to a variety of ball valves to effect remote control of the valves.

BACKGROUND ART

Many different types of valves are used to control fluid flow of both gases and liquids. Commonly used types include stop cocks, plug valves, butterfly valves, gate valves, globe valves and ball valves. However, ball valves, because of their simplicity and effectiveness, make up about 35% of all fluid control valves in use. Of these ball valves, most are two-piece types, with a few heavy duty applications being one- and three-piece types. The subject matter of the current invention relates to two-piece type ball valves. A two-piece ball valve includes a body, with a ball therein having an integrated handle for rotating the ball within the body. A passage extends entirely through the ball and allows fluid flow when the ball is rotated so that the passage is aligned with the direction of flow through a pipe. When the ball valve passage is so positioned as to allow fluid flow, the ball valve handle is normally also aligned with the pipe. Conversely, when the ball valve is closed to flow, the handle is normally at right angles to the pipe.

It is often advantageous to provide power controls for ball valves in lieu of manual control via the ball valve handle. Power controls are typically useful where: (a) multiple valves must be operated in a system; (b) remote control is desired; (c) flow pressures make manual operation difficult; or (d) a combination of the aforementioned factors is present. Depending upon the application involved, it may be desirable for the ball valve to be (1) normally in the open position, and actuatable to the closed position; or (2) to be normally closed and actuatable to the open position. Power controls are typically actuated either by electric or pneumatic motors, or operators. The present invention relates to pneumatic operators.

Various types of pneumatic operators have been used to control ball valves. All such controls as are known, however, have involved the use of some form of rack and pinion arrangement connected to the ball valve, and driven by a pneumatic cylinder having a piston connected to the rack portion of the rack and pinion arrangement. Typically, such a valve operator dispenses with the usual ball valve handle, and instead provides a ball valve shaft which is rotated directly by the movement pinion gears.

While rack and pinion operators generally perform their function well, there are several disadvantages connected with their use. Most apparent of these disadvantages is the loss of mechanical advantage with the rack and pinion approach. This results from doing away with the ball valve handle, which normally would act as a lever in opening and closing the valve. The forces required to open and close a ball valve depend upon the differential pressure across the valve, as well as upon the size of the ball involved. In a typical situation involving 200 psi pipe pressure with a 1" ball valve, approximately 50 to 100 psi pneumatic pressure would be required to operate a rack and pinion valve control system. The valve control using this relatively high pneumatic pressure is necessarily more complex and more expensive than would be a valve control using a lower pneumatic pressure.

In addition, rack and pinion valve control operators are necessarily designed to work exclusively with one particular ball valve and no other. This lack of adaptability can be a significant restraint on the users of the valve controls, especially where multiple valves are involved, as is often the case. Further, rack and pinion ball valve controls are typically designed to operate valves only from one particular starting orientation, for example from a normally open position. If a normally closed position were later desired, additional parts might be required to effect the change in set-up, or such a set-up change might even be found to be impossible. A further, related limitation of the rack and pinion approach is that the set-up must adopt precisely a particular orientation of the pneumatic cylinder and shaft relative to the ball valve. Any variation from the required orientation will generally result in the rack and pinion arrangement not working properly. This inflexibility of set-up requirements may at times be inconvenient due to the complex and unpredictable nature of piping arrangements that may occur. Finally, rack and pinion operators are somewhat complex in their design, and therefore tend to be expensive.

It is therefore an object of the present invention to provide a ball-valve control operator which is simple and efficient in design and thus is relatively inexpensive.

It is a further object of this invention to provide an operator which has a significantly improved mechanical advantage, and is therefor capable of utilizing less pneumatic pressure to perform its function, resulting in greater simplicity of operation and significantly reduced cost.

It is still a further object of this invention to provide a valve control which is adaptable for use with a variety of ball valves and pipes.

Finally, it is an object of this invention to provide a ball valve control operator which may be mounted in a variety of ways depending upon the needs of the fluid flow system involved. In particular, it is desired to provide an operator which may be set up to accommodate a valve which is in either a normally open or a normally closed position.

BEST MODE FOR CARRYING OUT THE INVENTION

Figure 1:
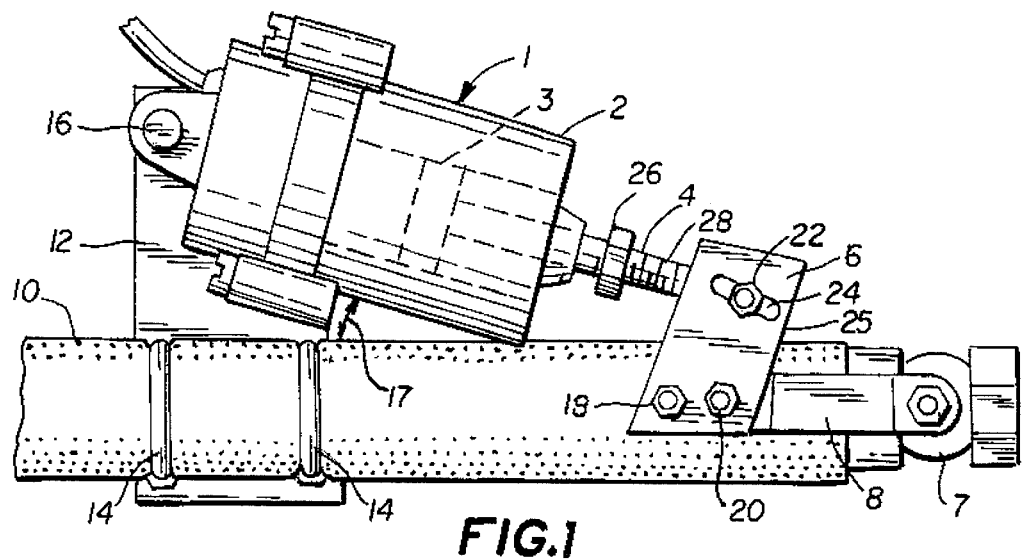
FIG. 1 is a side elevational view of a ball valve operator of the present invention mounted to operate a valve which is in the normally open position.
Figure 2:
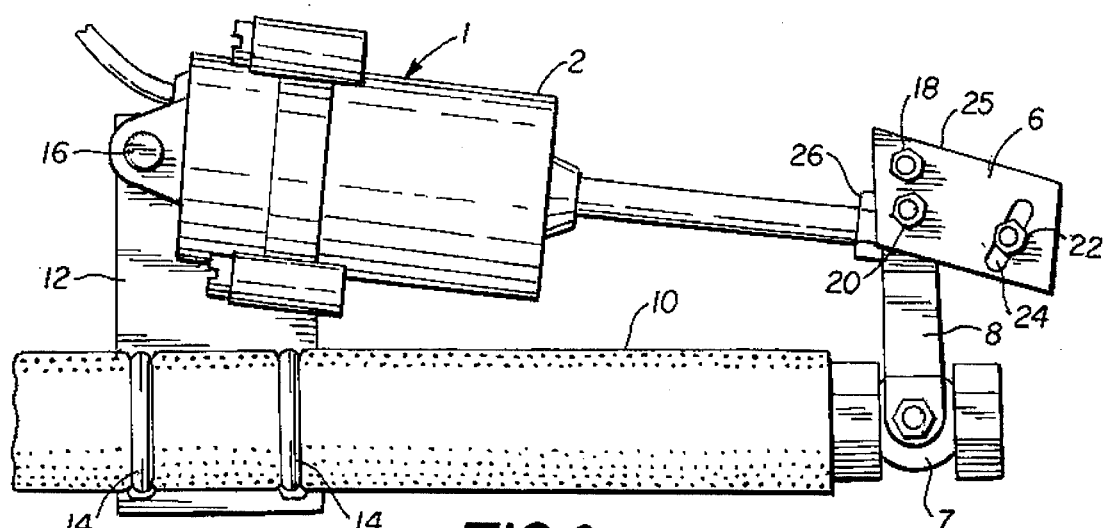
FIG. 2 is a side elevational view of the operator of FIG. 1, showing the positions of the cylinder, piston, and handle after the operator has moved the valve into the closed position.
Figure 3:
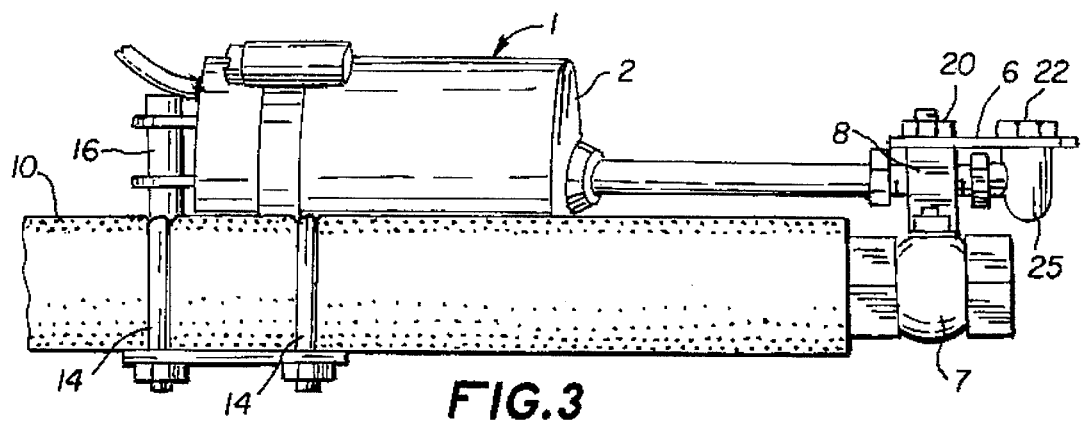
FIG. 3 is a bottom view of the operator of FIG. 2, showing the swivel mounting for the operator.

Referring now to FIGS. 1–3, there is depicted an operator 1 according to the present invention. The operator 1 includes a single-acting pneumatic cylinder 2 having a piston 3 with piston stem 4 extending therefrom. The pneumatic cylinder 2 is spring-loaded for automatic return when not under pressure. A piston is attached to adaptor plate 6, which is in turn mounted to ball valve handle 8. As shown in FIGS. 1–3, the operator is in use on a ball valve which is in the normally open position, i.e., until the ball valve handle is moved by extension of the piston stem 4, the ball valve remaining in the open position.

Figure 5:
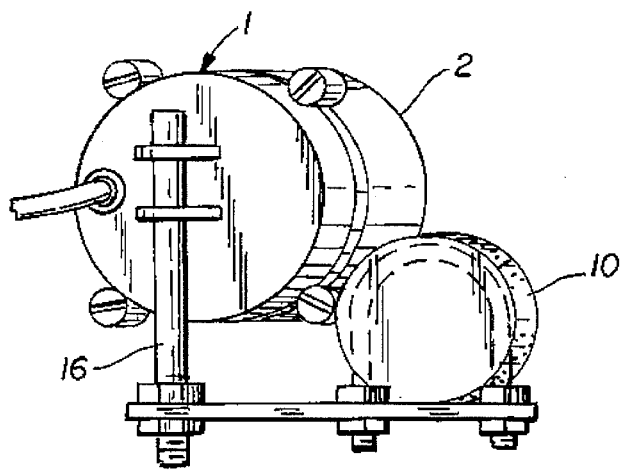
FIG. 5 is an end view of an operator showing the swivel mounting.
Figure 6:
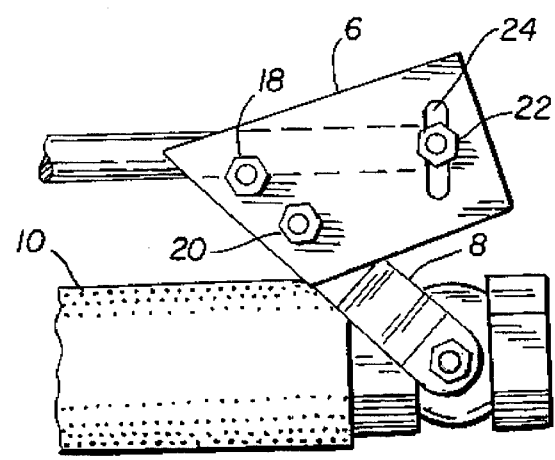
FIG. 6 is a partial view of the operator of FIGS. 1 and 2, showing the position of the piston, handle, and adaptor plate at a point where the valve is approximately half-way between open and closed.

The operator 1 is mounted to a pipe 10 by means of a mounting plate 12 secured to the pipe by mounting brackets 14. The operator is rotatably mounted on mounting stem 16, which extends from the plate 12. As best seen in FIGS. 3 and 5, this mounting arrangement allows the entire operator 1 to swivel about the stem 16 during operation, which is necessary to successful functioning of the operator, as will be discussed.

The setup for the operator is critical to obtaining the best results with this invention. First of all, the operator 1 is mounted at an angle 17 to the pipe 10, rather than being mounted in a parallel orientation to the pipe. This allows the operator to obtain its maximum mechanical advantage during the middle to later stages of the actuation of the ball valve handle 8, when resistance of the handle to movement is greatest. Additionally, mounting the operator at an angle to the pipe creates a gap between the cylinder and the pipe. This serves to protect the cylinder from high temperatures in the pipe, which are common in the usual applications of the operator. If desired, insulation may be added in the gap between the pipe and the cylinder, to further protect the cylinder from heat in the pipe. The adaptor plate 6 is attached to the handle 8 by use of fasteners 18, 20, preferably nut and bolt fasteners as shown. The piston is attached to the adaptor plate by use of the single adjustable fastener 22 located within the adaptor plate slot 24. The fastener 22 is mounted in a ball joint 25 on the piston stem 4, allowing for free rotation of the fastener during movement of the piston stem. By adjusting the fastener within the slot 24, the setup of the operator may be effectively fine tuned to function so that the maximum thrust of the piston does not push the handle 8 fully to the ball valve's closed position, but instead stops just a fraction of an inch (usually less than ⅛") short of the fully closed valve position. In this way, the full piston force is not transferred to the valve body and connected piping through the handle, yet at full piston extension the ball valve is sufficiently closed for all practical purposes. This adjustability of the operator may optionally be further enhanced by providing a threaded locking nut 26 which allows a threaded telescoping portion 28 of the piston to be extended or retracted and locked into a desired position.

As may be seen from the foregoing discussion, the operator is adjustable enough to be set up to function with a wide variety of sizes and configurations of pipes, of ball valves, and handles. Additionally, since the piston is connected to the ball valve handle, the mechanical advantage of the handle is not lost as it is with the rack and pinion approach. For this reason, the present invention may operate a valve with a 200 psi differential pressure by using a pneumatic cylinder having only roughly 20 psi., as contrasted with a pressure of approximately 60 psi. required with a rack and pinion system. This significantly decreases the complexity and cost of the operator of the present invention, as compared to other types of operators currently available.

Figure 4:
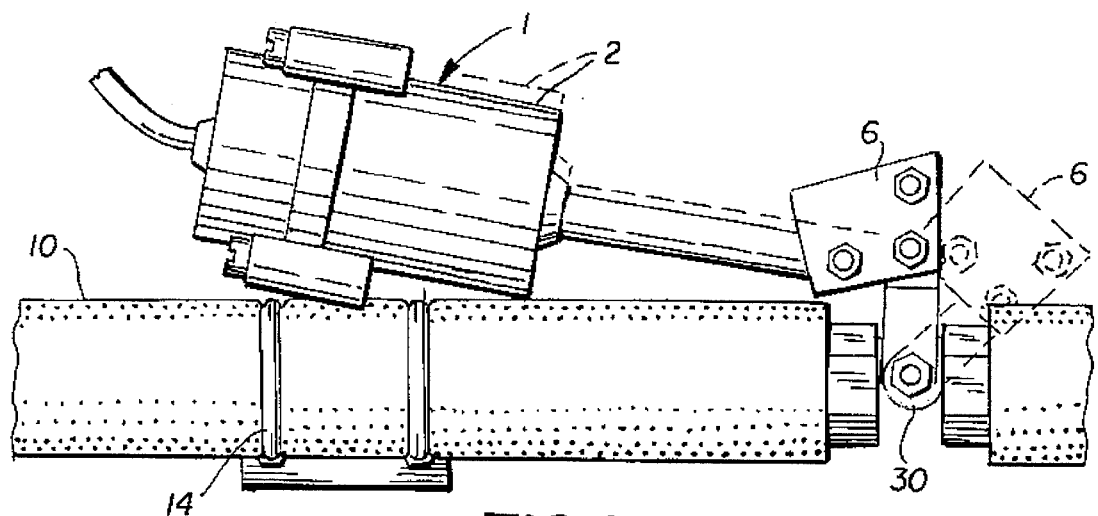
FIG. 4 is a side view of an operator mounted to operate a valve which is normally closed, with changes in position of the operator and handle for the open position shown by dashed lines.

Referring now to FIG. 4, an operator 1 according to the present invention is shown mounted to a ball valve 30 which is in the normally closed position, as contrasted with the valve 7 of FIGS. 1–3, which was in the normally open position. A mounting of the operator to a valve in the normally closed position may be as quickly and easily effected as a mounting to a normally open valve, simply by selecting a mounting location on the pipe which allows the piston stem to push the handle from its selected normal position to its corresponding actuated position. This is a significant advantage over previously known operators, which at best may only be able to achieve normally open or normally closed operation with the aid of additional parts, and which even may not be capable of changing the action of the operator at all.

This invention has been described in detail with reference to a particular embodiment thereof, but it will be understood that various other modifications can be effected within the spirit and scope of this invention.

I claim:

1. A ball valve operator for a ball valve mounted in a pipe and having a control handle with a first position corresponding to the valves normal position and a second position corresponding to the valve's actuated position, comprising:

a pneumatic cylinder mountable on the pipe;

a piston drivable by said cylinder through a piston stroke and including a piston stem having a proximal end and a distal end;

an adaptor plate having fastening means for attachment of said plate to said valve handle at an attachment point;

fastening means rotatably affixed to said piston for attaching said piston to said plate; and adjusting means for varying the spatial relationship of the attachment point to said stroke so that said operator may first be mounted to the pipe and said spatial relationship may subsequently be adjusted so that said handle, when acted upon by said piston stem, moves from its first position to a position which is selected to provide desired flow through said valve without reaching said second position prior to said piston reaching the end of its said stroke.

2. A ball valve operator as claimed in claim 1, wherein:

said adjusting means includes a slot in said adapter plate for movably receiving said fastening means and allowing said fastening means to be locked in place at a selected attachment point.

3. A ball valve operator as claimed in claim 1, wherein:

said adjusting means includes a telescoping distal portion of said piston stem which may be selectively extended or retracted to vary the effective length of said piston stem and having means for locking said distal portion into a selected position.

\* \* \* \* \*